United States Patent
Feng

(10) Patent No.: US 11,239,763 B2
(45) Date of Patent: Feb. 1, 2022

(54) INTERPHASE POWER TRANSFORMER FOR ELECTRICAL SYSTEMS

(71) Applicant: Hamilton Sundstrand Corporation, Charlotte, NC (US)

(72) Inventor: Frank Z. Feng, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 52 days.

(21) Appl. No.: 16/735,043

(22) Filed: Jan. 6, 2020

(65) Prior Publication Data
US 2021/0211064 A1    Jul. 8, 2021

(51) Int. Cl.
H02M 7/06 (2006.01)
H02M 7/08 (2006.01)
H02M 1/14 (2006.01)

(52) U.S. Cl.
CPC .............. H02M 7/08 (2013.01); H02M 7/068 (2013.01)

(58) Field of Classification Search
CPC ........ H02M 7/06; H02M 7/066; H02M 7/068; H02M 7/08; H02M 1/14; H02M 1/143; H02M 2001/0064
See application file for complete search history.

(56) References Cited

U.S. PATENT DOCUMENTS

| | | |
|---|---|---|
| 3,021,471 A | 2/1962 | Engstrom |
| 3,624,488 A | 11/1971 | Rabut |
| 4,968,926 A | 11/1990 | Dhyanchand |
| 5,012,177 A | 4/1991 | Dhyanchand et al. |
| 5,050,058 A | 9/1991 | April et al. |
| 6,101,113 A | 8/2000 | Paice |
| 6,396,340 B1 * | 5/2002 | Schmitt ................ H03F 3/2171 330/10 |
| 8,704,473 B2 | 4/2014 | Harbourt et al. |

(Continued)

FOREIGN PATENT DOCUMENTS

GB    505301 A    5/1939

OTHER PUBLICATIONS

Acosta, O. Interphase Transformer for Multiple Connected Power Rectifiers:, IEEE Transactions on Industry and General Applications, Nov./Dec. 1965, vol. IGA-1, No. 6, pp. 423-428.

(Continued)

*Primary Examiner* — Sisay G Tiku
(74) *Attorney, Agent, or Firm* — Cantor Colburn LLP

(57) ABSTRACT

The transformer includes a core. The transformer includes a first rectifier voltage connection winding wound on the core operable to conduct with the first rectifier voltage connection. The transformer includes a second rectifier voltage connection winding wound on the core operable to conduct with the second rectifier voltage connection, the second rectifier voltage connection winding operable to form a first magnetic flux with the first rectifier voltage connection winding. The transfer includes a first rectifier return connection winding wound on the core operable to conduct with the first rectifier return connection. The transformer includes a second rectifier return connection winding wound on the core operable to conduct with the second rectifier return connection, the second rectifier return connection winding operable to form a second magnetic flux with the first rectifier return connection winding and operable to form a net flux with the first rectifier voltage connection winding.

18 Claims, 2 Drawing Sheets

(56) References Cited

U.S. PATENT DOCUMENTS

| | | | | |
|---|---|---|---|---|
| 8,723,385 B2* | 5/2014 | Jia | ................ | H02K 3/28 |
| | | | | 310/168 |
| 8,729,844 B2* | 5/2014 | Feng | ................ | H02M 1/126 |
| | | | | 318/400.3 |
| 8,873,263 B2* | 10/2014 | Feng | ................ | H01F 30/02 |
| | | | | 363/143 |
| 8,923,026 B2 | 12/2014 | Nanut et al. | | |
| 9,077,237 B2* | 7/2015 | Ganev | ................ | H01F 30/14 |
| 10,199,161 B2* | 2/2019 | Valdivia-Guerrero | ................ | |
| | | | | H01F 30/02 |
| 10,742,133 B1* | 8/2020 | Feng | ................ | H02M 7/219 |
| 2006/0152949 A1 | 7/2006 | Cester | | |
| 2007/0258275 A1 | 11/2007 | Brochu et al. | | |
| 2008/0165553 A1* | 7/2008 | Swamy | ................ | H02M 7/08 |
| | | | | 363/67 |
| 2009/0067206 A1* | 3/2009 | Oguchi | ................ | H02M 3/156 |
| | | | | 363/124 |
| 2009/0231891 A1* | 9/2009 | Laitinen | ................ | H02M 7/06 |
| | | | | 363/44 |
| 2010/0176755 A1* | 7/2010 | Hoadley | ................ | H02P 27/06 |
| | | | | 318/105 |
| 2011/0051480 A1* | 3/2011 | Blanchery | ................ | H02M 7/068 |
| | | | | 363/154 |
| 2015/0228397 A1* | 8/2015 | Sorel | ................ | H01F 27/38 |
| | | | | 363/64 |
| 2015/0285871 A1* | 10/2015 | Pollard | ................ | G01R 19/155 |
| | | | | 324/107 |
| 2016/0134211 A1* | 5/2016 | Rollin | ................ | H02M 1/12 |
| | | | | 318/400.3 |

OTHER PUBLICATIONS

Bhide, R.S. and S.V. Kulkarni, "Analysis of Parallel Operation of Converters with Interphase Transformer", Proceedings of India International Conference on Power Electronics, 2006, pp. 193-196.
Search Report issued in European Application No. 21150286.9; Application Filing Date Jan. 5, 2021; dated Jun. 18, 2021 (12 pages).

* cited by examiner

INTERPHASE POWER TRANSFORMER FOR ELECTRICAL SYSTEMS

BACKGROUND

Generators may be used to generate alternating currents. Rectifiers may be used to converter alternating current to direct current. More than one rectifier may be associated with one or more generator.

BRIEF DESCRIPTION

Disclosed is a direct current power supply. The direct current power supply includes a generator having a first generator winding and a second generator winding. The direct current power supply includes a first rectifier having a first rectifier input associated with the first generator winding and a first rectifier output comprising a first rectifier voltage connection and a first rectifier return connection. The direct current power supply includes a second rectifier having a second rectifier input associated with the second generator winding and a second rectifier output comprising a second rectifier voltage connection and a second rectifier return connection. The direct current power supply includes a transformer. The transformer has a core. The transformer has a first rectifier voltage connection winding wound on the core operable to conduct with the first rectifier voltage connection. The transformer has a second rectifier voltage connection winding wound on the core operable to conduct with the second rectifier voltage connection, the second rectifier voltage connection winding operable to form a first magnetic flux with the first rectifier voltage connection winding. The transformer has a first rectifier return connection winding wound on the core operable to conduct with the first rectifier return connection. The transformer has a second rectifier return connection winding wound on the core operable to conduct with the second rectifier return connection, the second rectifier return connection winding operable to form a second magnetic flux with the first rectifier return connection winding and operable to form a net flux with the first rectifier voltage connection winding.

In addition to one or more of the features described above, or as an alternative, further embodiments may include that the first generator winding is a first three-phase winding and the second generator winding is a second three-phase winding.

In addition to one or more of the features described above, or as an alternative, further embodiments may include that the transformer defines a transformer output having a first terminal and a second terminal and the first rectifier voltage connection and the second rectifier voltage connection are joined to the first terminal and the first rectifier return connection and the second rectifier return connection are joined to the second terminal.

In addition to one or more of the features described above, or as an alternative, further embodiments may include that the first rectifier voltage connection winding and the second rectifier voltage connection winding have the same number of turns.

In addition to one or more of the features described above, or as an alternative, further embodiments may include that the first rectifier voltage connection winding and the second rectifier voltage connection winding are out of phase.

In addition to one or more of the features described above, or as an alternative, further embodiments may include that the first rectifier return connection winding and the second rectifier return connection winding have the same number of turns.

In addition to one or more of the features described above, or as an alternative, further embodiments may include that the first rectifier return connection winding and the second rectifier return connection winding are out of phase.

In addition to one or more of the features described above, or as an alternative, further embodiments may include that the core is defined by two C-shaped cores.

In addition to one or more of the features described above, or as an alternative, further embodiments may include that the first rectifier voltage connection winding and first rectifier return connection winding are wound on a first of the two C-shaped cores, and the second rectifier voltage connection winding and the second rectifier return connection winding are wound on a second of the two C-shaped cores.

In addition to one or more of the features described above, or as an alternative, further embodiments may include that the core is toroidal, and the first rectifier voltage connection winding, first rectifier return connection winding, the second rectifier voltage connection winding, and second rectifier return connection winding are spaced equidistant in a circumferential direction on the core.

Also disclosed is a direct current power supply. The direct current power supply includes a first rectifier voltage connection operable to engage a first rectifier output. The direct current power supply includes a first rectifier return connection operable to engage the first rectifier output. The direct current power supply includes a second rectifier voltage connection operable to engage a second rectifier output. The direct current power supply includes a second rectifier return connection operable to engage the second rectifier output. The direct current power supply includes a transformer. The transformer includes a core. The transformer includes a first rectifier voltage connection winding wound on the core operable to conduct with the first rectifier voltage connection. The transformer includes a second rectifier voltage connection winding wound on the core operable to conduct with the second rectifier voltage connection, the second rectifier voltage connection winding operable to form a first magnetic flux with the first rectifier voltage connection winding. The transfer includes a first rectifier return connection winding wound on the core operable to conduct with the first rectifier return connection. The transformer includes a second rectifier return connection winding wound on the core operable to conduct with the second rectifier return connection, the second rectifier return connection winding operable to form a second magnetic flux with the first rectifier return connection winding and operable to form a net flux with the first rectifier voltage connection winding.

In addition to one or more of the features described above, or as an alternative, further embodiments may include a first rectifier having the first rectifier output comprising the first rectifier voltage connection and the first rectifier return connection.

In addition to one or more of the features described above, or as an alternative, further embodiments may include a second rectifier having the second rectifier output comprising the second rectifier voltage connection and the second rectifier return connection.

In addition to one or more of the features described above, or as an alternative, further embodiments may include a generator having a first generator winding and a second generator winding, wherein the first rectifier has a first rectifier input associated with the first generator winding and the second rectifier has a second rectifier input associated with the second generator winding.

In addition to one or more of the features described above, or as an alternative, further embodiments may include that the first generator winding is a first three-phase winding and the second generator winding is a second three-phase winding.

In addition to one or more of the features described above, or as an alternative, further embodiments may include that the transformer defines a transformer output having a first terminal and a second terminal and the first rectifier voltage connection and the second rectifier voltage connection are joined to the first terminal and the first rectifier return connection and the second rectifier return connection are joined to the second terminal.

In addition to one or more of the features described above, or as an alternative, further embodiments may include that the first rectifier voltage connection winding and the second rectifier voltage connection winding have the same number of turns, and the first rectifier voltage connection winding and the second rectifier voltage connection winding are out of phase.

In addition to one or more of the features described above, or as an alternative, further embodiments may include that the first rectifier return connection winding and the second rectifier return connection winding have the same number of turns and the first rectifier return connection winding and the second rectifier return connection winding are out of phase.

In addition to one or more of the features described above, or as an alternative, further embodiments may include that the core is defined by two C-shaped cores.

In addition to one or more of the features described above, or as an alternative, further embodiments may include that the first rectifier voltage connection winding and first rectifier return connection winding are wound on a first of the two C-shaped cores, and the second rectifier voltage connection winding and the second rectifier return connection winding are wound on a second of the two C-shaped cores.

In addition to one or more of the features described above, or as an alternative, further embodiments may include that the core is toroidal, and the first rectifier voltage connection winding, first rectifier return connection winding, the second rectifier voltage connection winding, and second rectifier return connection winding are spaced equidistant in a circumferential direction on the core.

Also disclosed is a direct current power supply. The direct current power supply includes a first rectifier voltage connection operable to engage a first rectifier output. The direct current power supply includes a first rectifier return connection operable to engage the first rectifier output. The direct current power supply includes a second rectifier voltage connection operable to engage a second rectifier output. The direct current power supply includes a second rectifier return connection operable to engage the second rectifier output. The direct current power supply includes a transformer. The transformer includes a core. The transformer includes a first rectifier voltage connection winding wound in an orientation on the core, the first rectifier voltage connection winding operable to conduct with the first rectifier voltage connection. The transformer includes a second rectifier voltage connection winding wound in the orientation on the core, the first rectifier voltage connection winding operable to conduct with the second rectifier voltage connection, the second rectifier voltage connection winding operable to form a first magnetic flux with the first rectifier voltage connection winding. The transformer includes a first rectifier return connection winding wound in the orientation on the core, the first rectifier voltage connection winding operable to conduct with the first rectifier return connection. The transformer includes a second rectifier return connection winding wound in the orientation on the core, the first rectifier voltage connection winding operable to conduct with the second rectifier return connection, the second rectifier return connection winding operable to form a second magnetic flux with the first rectifier return connection winding and operable to form a net flux with the first rectifier voltage connection winding.

In addition to one or more of the features described above, or as an alternative, further embodiments may include that the first magnetic flux defines a first magnetic flux in the circumferential direction, the second magnetic flux defines a second magnetic flux opposite the circumferential direction, and the net flux is defined by the first magnetic flux and the second magnetic flux.

BRIEF DESCRIPTION OF THE DRAWINGS

The following descriptions should not be considered limiting in any way. With reference to the accompanying drawings.

DETAILED DESCRIPTION

A detailed description of one or more embodiments of the disclosed apparatus and method are presented herein by way of exemplification and not limitation with reference to the Figures.

Figure 1:
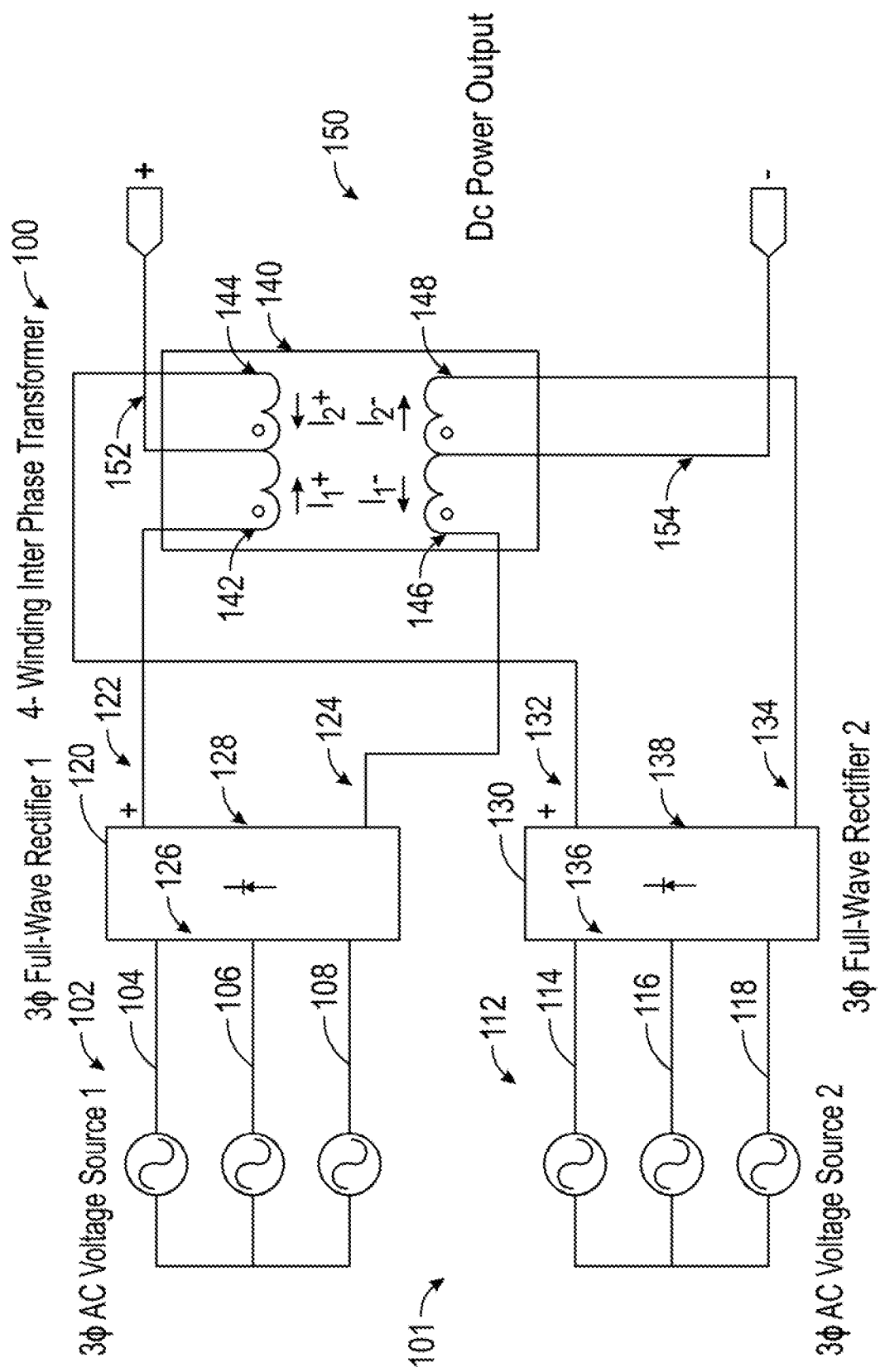
FIG. 1 illustrates a direct current power supply in accordance with one or more implementations of the present disclosure.
Figure 2:
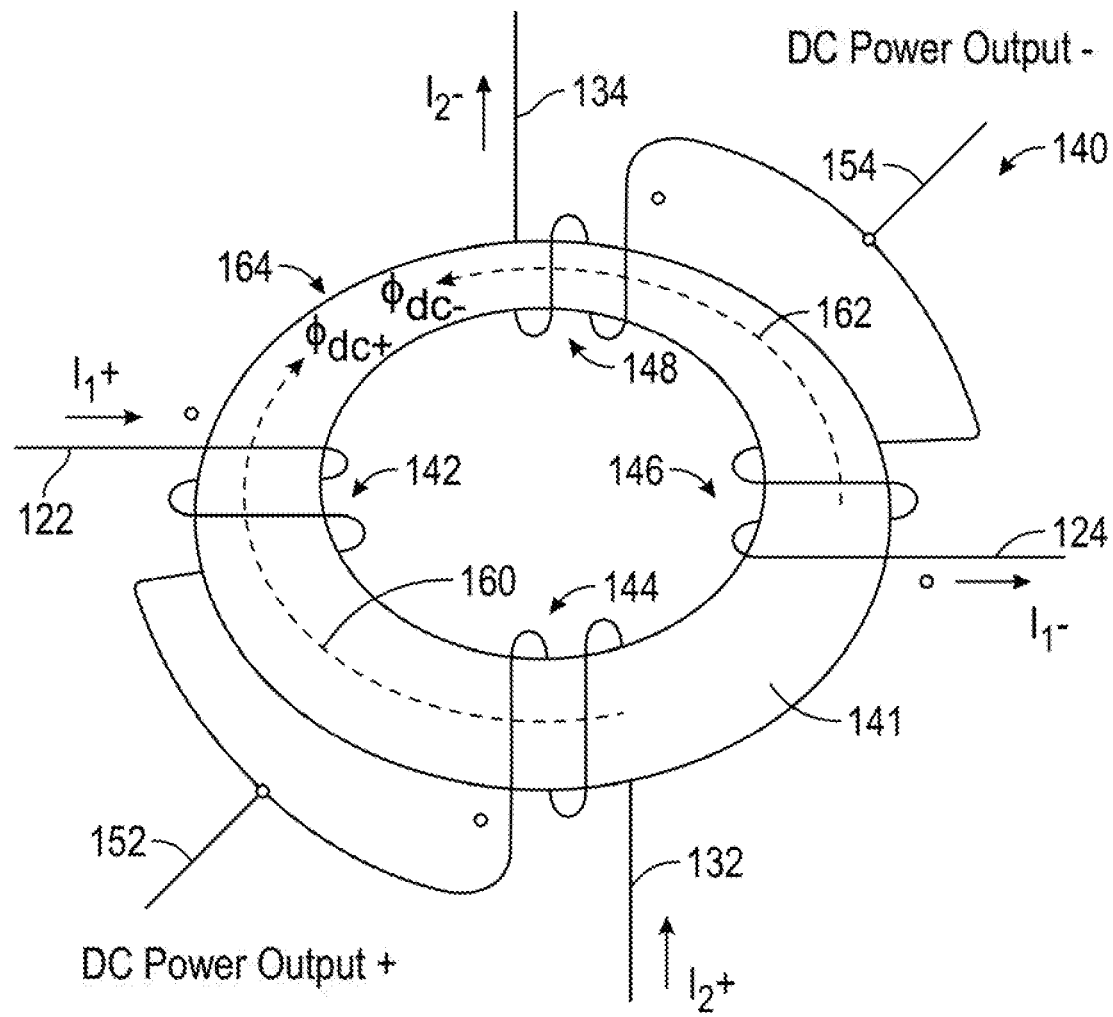
FIG. 2 illustrates a transformer in accordance with one or more implementations of the present disclosure.

Referring to FIGS. 1-2, a direct current power supply 100 is shown in accordance with one or more implementations of the present disclosure. The direct current power supply 100 may include a generator 101 or be associated with an alternating current power source. The generator 101 may include a first generator winding 102 and a second generator winding 112. The first generator winding 102 may define a set of first three-phase windings 104, 106, 108. The second generator winding 112 may define a set of second three-phase windings 114, 116, 118. It should be appreciated that any number of phases may be included or outputted by the generator 101. The generator 101 may be double wound or otherwise situated.

The first generator winding 102 is associated with a first rectifier input 126 of a first rectifier 120. The second generator winding 112 is associated with a second rectifier input 136 of a second rectifier 130. That is, the generator windings 102, 112 may be conductively connected with the rectifiers 120, 130 through rectifier inputs 126, 136. The rectifiers 120, 130 may be any type of rectifier including switched implementation or diode bridges. The first rectifier 120 includes a first rectifier output 128. The second rectifier 130 includes a second rectifier output 138. It should be appreciated that the inputs and outputs may be ports, links, connections, any other implement, or combination thereof. The first rectifier output 128 may include a first rectifier voltage connection 122 and a first rectifier return connection 124. The second rectifier output 138 may include a second rectifier voltage connection 132 and a second rectifier return connection 134.

The rectifier connections may be associated with a transformer 140. The transformer 140 includes a core 141. The core 141 may be of any type. The core 141 may include laminated steel and other materials. The core 141 may be toroidal, as shown. The core 141 may be C-shaped. The core 141 may be formed as a unitary element. The core 141 may include various pieces and parts to form any type of transformer shape. The transformer 140 includes windings wound on the core 141. Any number of windings are contemplated. The windings may include any number of turns that orbit, or partially orbit, the core 141. The windings may include an orientation. The orientation may designate clockwise or counterclockwise turns on the core 141. As an example, the first rectifier voltage connection 122 approaches the core 141 and is wound in a clockwise orientation to create the first rectifier voltage connection winding 142. That is, additional turns to the first rectifier voltage connection winding 142 are added in the clockwise direction of the core 141 instead of a counter-clockwise direction of the core 141.

The first rectifier voltage connection winding 142 may have any number of turns and is shown with two. A turn may include more or less than a 360° rotation about the core and may be defined by wire length or another parameter. A turn may be defined as each passing through the inside diameter of the core. The second rectifier voltage connection 132 approaches the core 141 and is wound in a clockwise orientation to create the second rectifier voltage connection winding 144. The second rectifier voltage connection winding 144 may have any number of turns and is shown with two. The first rectifier return connection 124 approaches the core 141 and is wound in a clockwise orientation to create the first rectifier return connection winding 146. The first rectifier return connection winding 146 may have any number of turns and is shown with about two. The second rectifier return connection 134 approaches the core 141 and is wound in a clockwise orientation to create the second rectifier return connection winding 148. The second rectifier return connection winding 148 may have any number of turns and is shown with two.

The first rectifier voltage connection winding 142 and the second rectifier voltage connection winding 144 may terminate at a first terminal 152 of the transformer output 150. The first rectifier return connection winding 146 and the second rectifier return connection winding 148 may terminate at a second terminal 154 of the transformer output 150.

As shown in FIG. 2, the first rectifier voltage connection winding 142 and the second rectifier voltage connection winding 144 define a first imbalance current that coincides with generated first magnetic flux 160. Although shown directionally, the first magnetic flux 160 may be defined by any necessary direction. The first imbalance current may be caused by non-ideal rectification of alternating current provided by the generator 101. The non-ideal rectification causes undulations or perturbations in the direct current provided by the first rectifier 120 and the second rectifier 130. As such, the first rectifier voltage connection winding 142 and the second rectifier voltage connection winding 144 are coupled out of phase, causing the resulting perturbations and undulations to interfere. As such, the perturbations and undulations are decreased by the first imbalance current.

The first rectifier return connection winding 146 and the second rectifier return connection winding 148 define a second imbalance current or coupling that coincides with generated second magnetic flux 162. Although shown directionally, the second magnetic flux 162 may be defined by any necessary direction. The second imbalance current may be caused by non-ideal rectification of alternating current provided by the generator 101 or other rectification issues. The rectification causes undulations or perturbations in the direct current provided by the first rectifier 120 and the second rectifier 130. As such, the first rectifier return connection winding 146 and the second rectifier return connection winding 148 are coupled out of phase, causing the resulting perturbations and undulations to interfere. As such, the perturbations and undulations are decreased by the second imbalance current.

The first magnetic flux 160 and the second magnetic flux 162 traversing the core 141 further interfere with one-another, causing a net flux 164 or coupling. The first magnetic flux 160 and the second magnetic flux 162 are generally equal and opposite in magnitude and sign, respectively. As such, the net flux 164 is zero or substantially zero. The net flux 164 may further decrease the perturbations and undulations. As such, the transformer output 150 has decreased alternating current perturbations and undulations.

The terminology used herein is for the purpose of describing the features associated with the present disclosure and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to features and parts, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to any particular features or parts disclosed as the best mode contemplated for carrying out this present disclosure, but that the present disclosure will include all that falls within the scope of the claims.

What is claimed is:

1. A direct current power supply comprising:
 a generator having a first generator winding and a second generator winding;
 a first rectifier having a first rectifier input associated with the first generator winding and a first rectifier output comprising a first rectifier voltage connection and a first rectifier return connection;
 a second rectifier having a second rectifier input associated with the second generator winding and a second rectifier output comprising a second rectifier voltage connection and a second rectifier return connection; and
 a transformer having:
  a core;
  a first rectifier voltage connection winding wound on the core operable to conduct a first imbalance current according to the first rectifier voltage connection;
  a second rectifier voltage connection winding wound on the core operable to conduct with the second rectifier voltage connection, the second rectifier voltage connection winding operable to form a first magnetic flux with the first rectifier voltage connection winding in response to receiving the first imbalance current;

a first rectifier return connection winding wound on the core operable to conduct a second imbalance current according to the first rectifier return connection; and a second rectifier return connection winding wound on the core operable to conduct with the second rectifier return connection, the second rectifier return connection winding operable to form a second magnetic flux with the first rectifier return connection winding and operable to form a net flux with the first rectifier voltage connection winding in response to receiving the second imbalance current, wherein the first rectifier voltage connection winding and the second rectifier voltage connection winding are out of phase and are configured to cause perturbations and undulations in the first imbalance current to interfere, and wherein the first rectifier return connection winding and the second rectifier return connection winding are out of phase and are configured to cause perturbations and undulations in the second imbalance current to interfere.

2. The direct current power supply of claim 1, wherein the first generator winding is a first three-phase winding and the second generator winding is a second three-phase winding.

3. The direct current power supply of claim 1, wherein the transformer defines a transformer output having a first terminal and a second terminal and the first rectifier voltage connection and the second rectifier voltage connection are joined to the first terminal and the first rectifier return connection and the second rectifier return connection are joined to the second terminal.

4. The direct current power supply of claim 1, wherein the first rectifier voltage connection winding and the second rectifier voltage connection winding have the same number of turns.

5. The direct current power supply of claim 1, wherein the first rectifier return connection winding and the second rectifier return connection winding have the same number of turns.

6. The direct current power supply of claim 1, wherein the core is defined by two C-shaped cores; and the first rectifier voltage connection winding and the first rectifier return connection winding are wound on a first of the two C-shaped cores, and the second rectifier voltage connection winding and the second rectifier return connection winding are wound on a second of the two C-shaped cores.

7. The direct current power supply of claim 1, wherein the core is toroidal, and the first rectifier voltage connection winding, first rectifier return connection winding, the second rectifier voltage connection winding, and second rectifier return connection winding are spaced equidistant in a circumferential direction on the core.

8. A direct current power supply comprising:

a first rectifier voltage connection operable to engage a first rectifier output;

a first rectifier return connection operable to engage the first rectifier output;

a second rectifier voltage connection operable to engage a second rectifier output;

a second rectifier return connection operable to engage the second rectifier output; and a transformer having:
 a core;
 a first rectifier voltage connection winding wound on the core operable to conduct a first imbalance current according to the first rectifier voltage connection;

a second rectifier voltage connection winding wound on the core operable to conduct with the second rectifier voltage connection, the second rectifier voltage connection winding operable to form a first magnetic flux with the first rectifier voltage connection winding in response to receiving the first imbalance current, a first rectifier return connection winding wound on the core operable to conduct a second imbalance current according to the first rectifier return connection; and a second rectifier return connection winding wound on the core operable to conduct with the second rectifier return connection, the second rectifier return connection winding operable to form a second magnetic flux with the first rectifier return connection winding and operable to form a net flux with the first rectifier voltage connection winding in response to receiving the first imbalance current, wherein the first rectifier voltage connection winding and the second rectifier voltage connection winding are out of phase and are configured to cause perturbations and undulations in the first imbalance current to interfere, and wherein the first rectifier return connection winding and the second rectifier return connection winding are out of phase and are configured to cause perturbations and undulations in the second imbalance current to interfere.

9. The direct current power supply of claim 8, further comprising a first rectifier having the first rectifier output comprising the first rectifier voltage connection and the first rectifier return connection; and a second rectifier having the second rectifier output comprising the second rectifier voltage connection and the second rectifier return connection.

10. The direct current power supply of claim 9, further comprising a generator having a first generator winding and a second generator winding, wherein the first rectifier has a first rectifier input associated with the first generator winding and the second rectifier has a second rectifier input associated with the second generator winding.

11. The direct current power supply of claim 10, wherein the first generator winding is a first three-phase winding and the second generator winding is a second three-phase winding.

12. The direct current power supply of claim 11, wherein the transformer defines a transformer output having a first terminal and a second terminal and the first rectifier voltage connection and the second rectifier voltage connection are joined to the first terminal and the first rectifier return connection and the second rectifier return connection are joined to the second terminal.

13. The direct current power supply of claim 12, wherein the first rectifier voltage connection winding and the second rectifier voltage connection winding have the same number of turns, and the first rectifier voltage connection winding and the second rectifier voltage connection winding are out of phase.

14. The direct current power supply of claim 12, wherein the first rectifier return connection winding and the second rectifier return connection winding have the same number of turns and the first rectifier return connection winding and the second rectifier return connection winding are out of phase.

15. The direct current power supply of claim 8, wherein the core is defined by two C-shaped cores; and the first rectifier voltage connection winding and first rectifier return connection winding are wound on a first of the two C-shaped cores, and the second rectifier voltage connection winding and the second rectifier return connection winding are wound on a second of the two C-shaped cores.

16. The direct current power supply of claim 8, wherein the core is toroidal, and the first rectifier voltage connection winding, first rectifier return connection winding, the second rectifier voltage connection winding, and second rectifier return connection winding are spaced equidistant in a circumferential direction on the core.

17. A direct current power supply comprising:
a first rectifier voltage connection operable to engage a first rectifier output;
a first rectifier return connection operable to engage the first rectifier output;
a second rectifier voltage connection operable to engage a second rectifier output;
a second rectifier return connection operable to engage the second rectifier output; and
a transformer having:
a core;
a first rectifier voltage connection winding wound in an orientation on the core, the first rectifier voltage connection winding operable to conduct a first imbalance current according to the first rectifier voltage connection;
a second rectifier voltage connection winding wound in the orientation on the core, the first rectifier voltage connection winding operable to conduct with the second rectifier voltage connection, the second rectifier voltage connection winding operable to form a first magnetic flux with the first rectifier voltage connection winding in response to receiving the first imbalance current;
a first rectifier return connection winding wound in the orientation on the core, the first rectifier voltage connection winding operable to conduct a second imbalance current according to the first rectifier return connection; and
a second rectifier return connection winding wound in the orientation on the core, the first rectifier voltage connection winding operable to conduct with the second rectifier return connection, the second rectifier return connection winding operable to form a second magnetic flux with the first rectifier return connection winding and operable to form a net flux with the first rectifier voltage connection winding in response to receiving the second imbalance current,
wherein the first rectifier voltage connection winding and the second rectifier voltage connection winding are out of phase and are configured to cause perturbations and undulations in the first imbalance current to interfere, and
wherein the first rectifier return connection winding and the second rectifier return connection winding are out of phase and are configured to cause perturbations and undulations in the second imbalance current to interfere.

18. The direct current power supply of claim 17, wherein the first magnetic flux defines a first magnetic flux in the circumferential direction, the second magnetic flux defines a second magnetic flux opposite the circumferential direction, and the net flux is defined by the first magnetic flux and the second magnetic flux.

* * * * *